United States Patent [19]

Arundale

[11] Patent Number: 5,117,623
[45] Date of Patent: Jun. 2, 1992

[54] OPERATING FLEXIBILITY IN IGCC STATIONS

[75] Inventor: David G. Arundale, Putney, England

[73] Assignee: Enserch International Investments Limited, Croydon, England

[21] Appl. No.: 482,905

[22] Filed: Feb. 22, 1990

[30] Foreign Application Priority Data

Feb. 23, 1989 [GB] United Kingdom ............... 894106
May 10, 1989 [GB] United Kingdom ............ 8910767

[51] Int. Cl.$^5$ ............................................. F02B 43/12
[52] U.S. Cl. .............................. 60/39.05; 48/197 R; 60/39.12
[58] Field of Search ............ 48/197 R, 206; 252/373; 60/39.02, 39.05, 39.12

[56] References Cited

U.S. PATENT DOCUMENTS

| | | | |
|---|---|---|---|
| 3,868,817 | 3/1975 | Marion et al. | 60/39.02 |
| 4,019,314 | 4/1977 | Springmann | 60/39.02 |
| 4,074,981 | 2/1978 | Slater | 252/373 |
| 4,075,831 | 2/1978 | McGann | 48/197 R |
| 4,121,912 | 10/1978 | Barber et al. | 60/39.02 |
| 4,132,065 | 1/1979 | McGann | 48/210 |
| 4,150,953 | 4/1979 | Woodmansee | 48/71 |
| 4,193,259 | 3/1980 | Muenger et al. | 60/39.12 |
| 4,250,704 | 2/1981 | Bruckner et al. | 60/39.12 |
| 4,261,167 | 4/1981 | Paull et al. | 60/39.02 |
| 4,590,760 | 5/1986 | Goebel et al. | 60/39.12 |

Primary Examiner—Peter Kratz
Attorney, Agent, or Firm—Bacon & Thomas

[57] ABSTRACT

A process for the production of power from a carbonaceous fuel comprising the steps of partially oxidizing the fuel with oxygen or an oxygen-containing gas to yield a gas stream containing combustible gas and steam, quenching that stream with quench water to cool and saturate the stream, passing the stream (A) through a heat exchanger in which the stream is further cooled by heat exchange with circulating water so condensing liquid water from the stream, expanding the stream (D) by lowering its pressure and removing sulphur compounds from the stream before or after lowering its pressure, heating and resaturating the steam (E), and then burning the stream (F) in a gas turbine to produce power, wherein it is the circulating water aforesaid which is used to provide the heat for resaturating the stream.

7 Claims, 1 Drawing Sheet

OPERATING FLEXIBILITY IN IGCC STATIONS

This invention relates to the production of electric power and particularly the production of power by the Integrated Gasification Combined Cycle (IGCC) process.

The present invention provides a process for the production of power from a carbonaceous fuel comprising the steps of partially oxidising the fuel with oxygen or an oxygen-containing gas to yield a gas stream containing combustible gas and steam, quenching that stream with quench water to cool and saturate the stream, passing the stream through a heat exchanger in which the stream is further cooled by heat exchange with circulating water so condensing liquid water from the stream, expanding the stream by lowering its pressure and removing sulphur compounds from the stream either before or after lowering its pressure, heating and resaturating the stream, and then burning the stream in a gas turbine to produce power, wherein it is the circulating water aforesaid which is used to provide the heat for resaturating the stream.

"Saturate" and "resaturate" are terms meaning to add a high steam content to a gas or gas mixture.

In this document a power station comprises two sections: the treated fuel gas preparation section, and the power generation section comprising gas turbines, heat recovery steam generators, steam turbines and associated power generation equipment. Each section is made up of units which in turn are made up of individual items of equipment.

The general process for the production of power by the IGCC method is known. In this process a carbonaceous fuel such as coal or heavy fuel oil is gasified by partial oxidation using oxygen to form a mixture of gases containing combustible gases. In the gasification process the sulphur compounds present in the fuel are mainly converted to hydrogen sulphide, with a small portion being reacted to carbonyl sulphide. The gases from the partial oxidation reactor are cooled, and the hydrogen sulphide is removed by means of washing with a suitable liquid in an acid gas removal unit which may also be designed to remove carbon dioxide from the gases. If desired, by art well known in ammonia production technology, substantially all the carbon dioxide may be removed from the fuel gas stream. The sulphur reduced gases are then usually reheated, mixed with steam and used as fuel in a gas turbine. The purpose of mixing the fuel gases with steam is to reduce the formation of oxides of nitrogen during combustion of the fuel in the gas turbine. The hot exhaust gases from the gas turbine are then fed to a heat recovery and steam generation unit. This unit uses the heat in the exhaust to raise steam for use in a steam turbine. This raises the overall efficiency of the conversion of fuel energy to electricity. Both the gas turbine and the steam turbine drive alternators which produce the electric power.

One of the major causes of loss of efficiency in the known process is the need to cool the gases prior to their entering the acid gas removal unit. The gases leaving the partial oxidation reactor are very hot—in the range of 1000 to 1500 Deg C. These gases have to be cooled to nearly ambient temperature in order to effect the removal of the sulphur compounds, and then the gases are preferably reheated prior to being used as fuel. This is to enable steam addition for the reduction of the production of oxides of nitrogen during combustion. Thermodynamically this cooling and subsequent reheating is inefficient.

Steam addition to the sulphur reduced fuel gases is conventionally effected by passing the gases counter-current to hot water in a saturator vessel. The cooled water from the saturator is then circulated together with make-up water through a water heater before returning to the saturator. The saturated fuel gases are then normally superheated before combustion.

Conventional IGCC normally utilises the so-called gas cooler mode of gasification to recover the high temperature waste heat in the hot gases from the partial oxidation reactor by employing radiant coolers, convective coolers and optionally an economiser. For this conventional IGCC all the heat required for the saturation and reheat of the cooled sulphur-reduced fuel gases after the acid gas removal unit may be taken either from the coolers after the partial oxidation reactor or alternatively from the heat recovery and steam generation unit fitted to the gas turbine exhaust. Other sources of heat may make a contribution to the saturation heat requirements; but only the gas coolers, and the heat recovery and steam generation units, have sufficient heat to be used as a single source.

The present invention relates to the so-called direct quench mode of gasification whereby the hot gases from the partial oxidation reactor are directly contacted by quench water to cool and saturate the gases. This mode of gasification is conventionally used for the production of synthesis gases for e.g. ammonia or methanol and not for the production of electric power.

If used in a power station, the direct quench mode of gasification exhibits a limit to the heat available from the quenched gases which it would be practicable to use for subsequent resaturation of the cooled sulphur-reduced fuel gases after the acid gas removal unit. This limit arises from the comparatively low temperature of the quenched gas stream. At least some of the heat for resaturation after acid gas removal has to be provided from the gas turbine heat recovery and steam generation unit.

U.S. Pat. No. 4,150,953 (Woodmansee) describes a power cycle. It does not disclose this invention. In particular, regarding pressure, column 3, line 19 of U.S. Pat. No. 4,150,953 clearly states that only "a slight drop along the gas path" would be experienced, which would be obvious to any reader. By contrast the present invention is concerned with a specific pressure reduction device in the flowsheet.

This invention uses a deliberate pressure difference between the gas quenching unit and the resaturator to increase both the driving force and the available heat which it is practicable to use for the resaturator circuit, such that there is sufficient of both to drive the resaturator circuit without the need to import any additional heat especially from the gas turbine heat recovery and steam generation unit.

As the fuel gas pressure before combustion is fixed by the design of the gas turbine combustor, this invention utilises a deliberate increase in gasification pressure above that normally employed in the conventional IGCC process. This increases the saturation temperature of the quenched fuel gases and thereby provides a greater temperature difference between the quenched fuel gases and the sulphur-reduced fuel gases during resaturation.

This invention uses a high enough gasification pressure to obviate the need to use heat for the resaturator circuit from the gas turbine heat recovery and steam generation unit. Preferably the gasification pressure is above 30 bara, more preferably above 40 bara, and most preferably above 50 bara. One bara is a pressure of one bar absolute which is equal to 14.50 psia, e.g. 30 bara=435 psia.

The advantages of this invention are as follows:

First, if required, the power generation section of the power station can be more easily operated using an alternate fuel because no heat needs to be taken from the heat recovery and steam generation unit on the gas turbine for fuel gas resaturation. In normal operation, the heat recovery and steam generation unit makes no contribution to the heating requirement of the fuel gas resaturator circuit. Therefore, when operating independently on an alternative fuel there will be no reduction in the thermal efficiency of the power generation section of the power station as a result of losing the heat load which would otherwise have been recycled through the fuel gas resaturator circuit.

Second, this decoupling of the treated fuel gas preparation section and the power generation section of the power station enables the design of each section to be more easily optimised Commercially, the two sections may be more easily supplied (and tested) by two different companies.

Third, there is an improvement in overall thermal efficiency of an IGCC power station designed for operation in the quench mode. Quench mode IGCC power stations have a higher reliability and hence availability than an IGCC power station designed for operation in the gas cooler mode.

The process of this invention comprises first quenching the gases from the partial oxidation reactor effluent with water, preferably adjusting the steam/gas ratio to that required by the resaturation circuit by raising steam from the gas/steam mixture and then cooling them down further in a heat exchanger thereby causing most of the steam present to condense: the gases pass through an acid gas removal unit either before or after being expanded, although devices such as a throttling valve could be used, such expansion is preferably effected in a turbine to gain shaft power. The gases are then passed through a direct contact resaturator wherein the high steam content is regained, the heat requirement for which is obtained from the heat given up in the heat exchange system used to cool the high steam content gases prior to the acid gas removal unit.

Preferably the flow of water in the resaturator circuit is: down the resaturator, up which flows the gas to be resaturated; into the indirect heat exchanger upstream of the acid gas removal unit wherein it is heated; and then back to the top of the resaturator. The water needed to replace that evaporated into the gas stream may be added to the circuit between the resaturator outlet and the heat exchanger. The pump to drive the circuit is usually situated at the bottom of the resaturator.

Alternatively the water heated in the indirect heat exchanger upstream of the acid gas removal unit may be circulated through heat exchange coils in the resaturator; the resaturator water being pumped around the resaturator with water makeup as above.

In general terms the overall resaturator circuit comprises a device for reducing the high content of steam of the high pressure gas stream - a desaturator, and a device for increasing the steam content of the low pressure gas stream—a resaturator. With respect to heat exchange between the gas stream and water in the water circuit, both the resaturator and desaturator may operate either by direct (heat and mass) transfer or by indirect (heat) transfer; thereby giving four alternatives. However in the case of IGCC, if both are direct, some of the sulphur compounds in the high pressure gas stream will dissolve in the circulating water in the desaturator and be stripped out of that water and into the gas stream in the resaturator. To ensure low sulphur emission this is not desirable, as it will allow sulphur compounds to bypass the acid gas removal unit and thereby allow sulphur to eventually escape into the atmosphere as sulphur dioxide. If both are direct it would be advisable to use a sulphur compound removal guard bed made of e.g. zinc oxide to remove any sulphur compounds thus bypassing the acid gas removal unit.

It would be possible to use the condensate from the upstream heat exchanger as part of the resaturator makeup water. However this condensate will contain dissolved hydrogen sulphide. This hydrogen sulphide would bypass the acid gas removal unit and thus the fuel gas would contain sulphur. It would be possible to steam strip the hydrogen sulphide from the condensate before using it as makeup, but any malfunctioning of the condensate system might allow the sulphur containing gas to bypass the acid gas removal unit and thereby allow sulphur to eventually escape into the atmosphere as sulphur dioxide. Again this could be guarded against as above. Nevertheless such condensate remains a potentially useful source of resaturator makeup water.

In essence this invention transfers heat across a lower temperature gas processing step in a very efficient manner. In effect it also allows steam to be transferred across that step.

A specific embodiment of this invention will now be described with reference to FIG. 1 and the associated flowstreams given in Table 1.

With respect to Table 1, it will be noted that specific values are given for the various components of the gas stream along different locations or flow streams (A-F) of the process. The flow streams A-F of Table 1 correspond to the flow streams A-F respectively of FIG. 1.

TABLE I

| | | MASS BALANCE - FUEL GAS PREPARATION | | | | | |
|---|---|---|---|---|---|---|---|
| | | STREAM | | | | | |
| STREAM MADE | | A Scrubbed Raw Gas | | B Exit Boiler | | C Cooled Gas | |
| Components | Mol. Wt. | kgmol/h | mol % | kgmol/h | mol % | kgmol/h | mol % |
| Methane | 16.043 | 35.84 | 0.39 | 35.84 | 0.39 | 35.84 | 0.39 |
| Hydrogen | 2.016 | 3997.25 | 43.66 | 3997.25 | 43.66 | 3997.25 | 43.66 |
| Carbon Monoxide | 28.010 | 4178.77 | 45.66 | 4178.77 | 45.66 | 4178.77 | 45.66 |
| Carbon Dioxide | 44.009 | 824.31 | 9.01 | 824.31 | 9.01 | 824.31 | 9.01 |
| Nitrogen | 28.010 | 17.93 | 0.20 | 17.93 | 0.20 | 17.93 | 0.15 |
| Argon | 39.950 | 13.40 | 0.15 | 13.40 | 0.15 | 13.40 | 0.15 |

TABLE I-continued

MASS BALANCE - FUEL GAS PREPARATION

|  |  |  |  |  |  |  |  |
|---|---|---|---|---|---|---|---|
| H$_2$S | 34.076 | 80.55 | 0.88 | 80.55 | 0.88 | 80.55 | 0.88 |
| COS | 60.070 | 4.12 | 0.05 | 4.12 | 0.05 | 4.12 | 0.05 |
| O$_2$ | 32.000 | | | | | | |
| SO$_2$ | 64.060 | | | | | | |
| TOTAL DRY | | 9152.17 | 100.00 | 9152.17 | 100.00 | 9152.17 | 100.00 |
| Water | 18.015 | 12107.00 | | 7600.00 | | 200.00 | |
| TOTAL WET | | 21259.17 | | 16752.17 | | 9352.17 | |
| TOTAL MASS FLOW (KG/H) | | 348095 | | 302901 | | 169590 | |
| MOLECULAR WEIGHT (WET) | | 18.07 | | 18.08 | | 18.13 | |

| | | STREAM | | | | | |
|---|---|---|---|---|---|---|---|
| | | D<br>AGR Feed | | E<br>Saturator Feed | | F<br>Gas Turbine Fuel | |
| STREAM MADE | | | | | | | |
| Components | Mol. Wt. | kgmol/h | mol % | kgmol/h | mol % | kgmol/h | mol % |
| Methane | 16.043 | 35.84 | 0.39 | 35.84 | 0.40 | 35.84 | 0.40 |
| Hydrogen | 2.016 | 3997.25 | 43.66 | 3997.25 | 44.08 | 3997.25 | 44.08 |
| Carbon Monoxide | 28.010 | 4178.77 | 45.66 | 4178.77 | 46.08 | 4178.77 | 46.08 |
| Carbon Dioxide | 44.009 | 824.31 | 9.01 | 824.31 | 9.09 | 824.31 | 9.09 |
| Nitrogen | 28.010 | 17.93 | 0.15 | 17.93 | 0.20 | 17.93 | 0.20 |
| Argon | 39.950 | 13.40 | 0.15 | 13.40 | 0.15 | 13.40 | 0.15 |
| H$_2$S | 34.076 | 80.55 | 0.88 | 0.00 | 0.00 | 0.00 | 0.00 |
| COS | 60.070 | 4.12 | 0.05 | 0.00 | 0.00 | 0.00 | 0.00 |
| O$_2$ | 32.000 | | | | | | |
| SO$_2$ | 64.060 | | | | | | |
| TOTAL DRY | | 9152.17 | 100.00 | 9067.50 | 100.00 | 9067.50 | 100.00 |
| Water | 18.015 | 15.00 | | 7.00 | | 6275.00 | |
| TOTAL WET | | 9167.17 | | 9074.50 | | 15342.50 | |
| TOTAL MASS FLOW (KG/H) | | 166257 | | 163122 | | 276039 | |
| MOLECULAR WEIGHT (WET) | | 18.14 | | 17.98 | | 17.99 | |

The description relates to the treated fuel gas preparation section of a 300 MW power station. One Kg Mol. is equal to 2.2045 points (lbs.) Mol.; e.g. 1 Kg. Mol. of water equals 18.015 Kg. which is 39.714 lbs. Feedstock coal is fed together with 99.5% pure oxygen at a pressure of 70 bara into a partial oxidation unit. The resulting mixture of gases is quenched using an excess of water, i.e. not all of the water evaporates, down to the saturation condition. The partial oxidation unit and quench are shown as items (1) and (2) on FIG. 1. This quench step is a gas washing step in addition to a gas cooling step.

The gas stream of composition (dry basis mole %): methane 0.4, hydrogen 43.7, carbon monoxide 45.6, carbon dioxide 9.0, nitrogen plus argon 0.4, hydrogen sulphide plus carbonyl sulphide 0.9, at a dry gas flow rate of 9152 Kg. Mol. per hour containing 12107 Kg. Mol. per hour of steam, at 240° C. and 63 bara is fed to a waste heat boiler (3). In this boiler (3) 44 Megawatts (MW) of heat are exchanged raising steam that is fed into the Power generation section of the power station. After the boiler the quantity of steam in the gas is reduced to 7600 Kg. Mol. per hour, the remaining steam having condensed and been separated in separator (4).

Next the stream flows through a fuel gas heater (5) and thence through a resaturator circuit water heater (6) in which the gas stream's temperature is reduced from 220° C. to 130° C. transferring 87 MW of heat.

After this, water is again separated in separator (7). At this stage the steam flow has been reduced to 200 Kg. Mol. per hour.

The gas then flows through an expander preheater (8) giving up a further 9 MW of heat. The gas is reduced to the temperature (30° C.) needed for entry into the acid gas removal unit (9) by being cooled in water heaters (10). By this time the steam flow is down to 15 Kg. Mol. per hour.

In the acid gas removal unit (9) the sulphur compounds are removed and turned into 85 Kg. Mol. per hour of sulphur.

After the acid gas removal unit the dry gas flow is 9069 Kg. Mol. per hour plus 7 Kg. Mol. per hour of steam. This stream then flows through the expander preheater (8) before being expanded in expander (11) giving 6 MW of shaft power.

In the expander (11) the stream is expanded from ca. 58 bara to 21 bara.

From the expander (11) the stream flows into the bottom of a resaturator (12) in which its temperature is raised by direct contact with water and the steam content of the stream is increased to 6275 Kg. Mol. per hour. Pump (13) circulates approximately 1 million kg per hour of water around the resaturator circuit. Make up water is added to the circuit at the rate of 6268 Kg. Mol. per hour.

The gas stream leaving the top of the resaturator (12) then passes through the fuel gas preheater (5) before being fed to a gas turbine (14) as fuel at 200° C. and 20 bara, and then to a heat recovery steam generator and steam turbine (15). The turbine (15) is also fed from the waste heat boiler (3). Clean stack gases finally emerge from the heat recovery steam generator (part of 15).

I claim:

1. A process for the production of power from a carbonaceous fuel comprising the steps of partially oxidizing the fuel with oxygen or an oxygen-containing gas to yield a partially oxidized gas stream containing combustible gas and stream; quenching the partially oxidized stream in a quenching unit with quench water to produce a quenched stream which is cooled and saturated; passing the quenched stream through a water-cooled heat exchanger in which the steam is further cooled by heat exchange with water circulating through said heat exchanger to produce a cooled gas stream and to heat said circulating water to produce a hot water stream; passing the cooled gas stream through a pressure reduction means to produce a low pressure stream; removing sulfur compounds from the cooled gas stream either before or after said pressure reduction; heating and resaturating the low pressure stream in a resaturator in which said hot water stream is used to provide the necessary humidity and heat whereby a low pressure saturated gas stream is produced; and then burning the low pressure saturated gas stream in a gas turbine to produce power; said pressure reduction produced in said pressure reduction means being at least as much as ordinary line pressure drop which occurs between the quenching unit and the resaturator.

2. A process as described in claim 1 wherein the partial oxidation is carried out at a pressure greater than 30 bara.

3. A process as claimed in claim 1 which further comprises the step of passing the quenched stream through a boiler to raise steam prior to passing the quenched stream through said heat exchanger.

4. A process as claimed in claim 1 which further includes the step of reheating the low pressure saturated gas stream after pressure reduction by heat exchange with the quenched gas stream.

5. A process as claimed in claim 1 wherein the pressure reduction is carried out in an expansion engine to produce shaft power.

6. A process as claimed in claim 1 wherein the partially oxidized gas stream contains carbon dioxide and substantially all of the carbon dioxide is removed from the gas stream prior to burning said gas in the gas turbine.

7. A process as claimed in claim 1 wherein the circulating water passing through said heat exchanger is heated by indirect contact with the quenched gas stream.

* * * * *

UNITED STATES PATENT AND TRADEMARK OFFICE
CERTIFICATE OF CORRECTION

PATENT NO.  :  B1 5,117,623
DATED       :  May 23, 1995
INVENTOR(S) :  David G. Arundale It is certified that error appears in the above-indentified patent and that said Letters Patent is hereby corrected as shown below:

The sheets of drawings consisting of Figs. 2, 3 and 4 should be added as per attached sheets.

Signed and Sealed this

Twenty-third Day of April, 1996

Attest:

BRUCE LEHMAN

*Attesting Officer*  *Commissioner of Patents and Trademarks*

REEXAMINATION CERTIFICATE (2588th)
United States Patent [19]
Arundale

[11] B1 5,117,623
[45] Certificate Issued May 23, 1995

[54] OPERATING FLEXIBILITY IN IGCC STATIONS

[75] Inventor: David G. Arundale, Putney, England

[73] Assignee: H&G Process Contracting Limited, Croydon, England

Reexamination Requests:
No. 90/003,165, Aug. 17, 1993
No. 90/003,467, Jun. 27, 1994

Reexamination Certificate for:
Patent No.: 5,117,623
Issued: Jun. 2, 1992
Appl. No.: 482,905
Filed: Feb. 22, 1990

[30] Foreign Application Priority Data
Feb. 23, 1989 [GB] United Kingdom .................. 894106
May 10, 1989 [GB] United Kingdom ................ 8910767

[51] Int. Cl.$^6$ ........................................... F02B 43/12
[52] U.S. Cl. ................................. 60/39.05; 48/197 R; 60/39.12

[56] References Cited
U.S. PATENT DOCUMENTS
3,731,485  5/1973  Rudolph ........................... 60/39.05
4,163,652  8/1979  Gazzi et al. .......................... 62/28

OTHER PUBLICATIONS

"RCH/RAG's Version of Texaco Coal Gasification", B. Cornils et al., *Hydrocarbon Processing*, Jan. 1981.
"Ente Nazionale Energia Elettrica" Direzione Studie Ricerche, 1989.
Matchak, et al. "Cost and Performance For Commercial Applications of Texaco-Based Gasification-Combined-Cycle Plants", vol. 2: Design Details, Electric Power Research Institute Report, Published May 1, 1985 and later as set forth below, pp. 4–13, 4–15, 4–25, and 4–43.
EPRI, EPRI Technical Report Distribution thru Apr. 1, 1992, dated Dec. 14, 1992, pp. 1–23.

*Primary Examiner*—Richard A. Bertsch

[57] ABSTRACT

A process for the production of power from a carbonaceous fuel comprising the steps of partially oxidizing the fuel with oxygen or an oxygen-containing gas to yield a gas stream containing combustible gas and steam, quenching that stream with quench water to cool and saturate the stream, passing the stream (A) through a heat exchanger in which the stream is further cooled by heat exchange with circulating water so condensing liquid water from the stream, expanding the stream (D) by lowering its pressure and removing sulphur compounds from the stream before or after lowering its pressure, heating and resaturating the steam (E), and then burning the stream (F) in a gas turbine to produce power, wherein it is the circulating water aforesaid which is used to provide the heat for resaturating the stream.

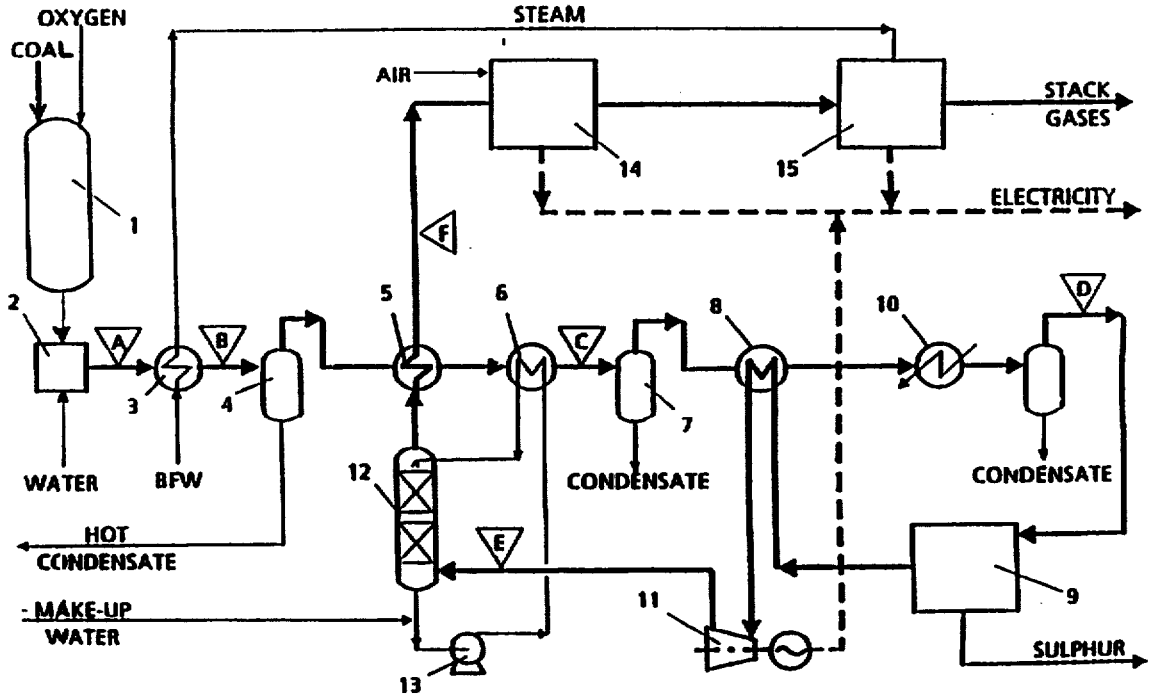

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 8–23:

The present invention provides a process for the production of power from a carbonaceous fuel comprising the steps of partially [oxidising] *oxidizing* the fuel with oxygen or an oxygen-containing gas to yield a gas stream containing combustible gas and steam, quenching that stream with quench water to cool and saturate the stream, passing the stream through a heat exchanger in which the stream is further cooled by heat exchange with circulating water so [condensing liquid water from the stream] *that liquid water is condensed from the stream*, expanding the stream by lowering its pressure and removing sulphur compounds from the stream either before or after lowering its pressure, heating and resaturating the stream, and then burning the stream in a gas turbine to produce power, wherein it is the circulating water aforesaid which is used to provide the heat for resaturating the stream.

Column 2, lines 10–24:

Conventional IGCC normally [utilises] *utilizes* the so-called gas cooler mode of gasification to recover the high temperature waste heat in the hot gases from the partial oxidation reactor by employing radiant coolers, convective coolers and optionally an economiser. For this conventional IGCC all the heat required for the saturation and reheat of the cooled sulphur-reduced fuel gases after the acid gas removal unit may be taken either from the coolers after the partial oxidation reactor or alternatively from the heat recovery and steam generation unit fitted to the gas turbine exhaust. Other sources of heat may make a contribution to the saturation heat requirements; but only the gas coolers, and the heat recovery and steam generation units, have sufficient heat to be used as a single source.

Column 4, lines 47–48:

*BRIEF DESCRIPTION OF THE DRAWING*

The drawing figures have been changed as follows: FIGS. 2–4 have been added.

Figure 1:
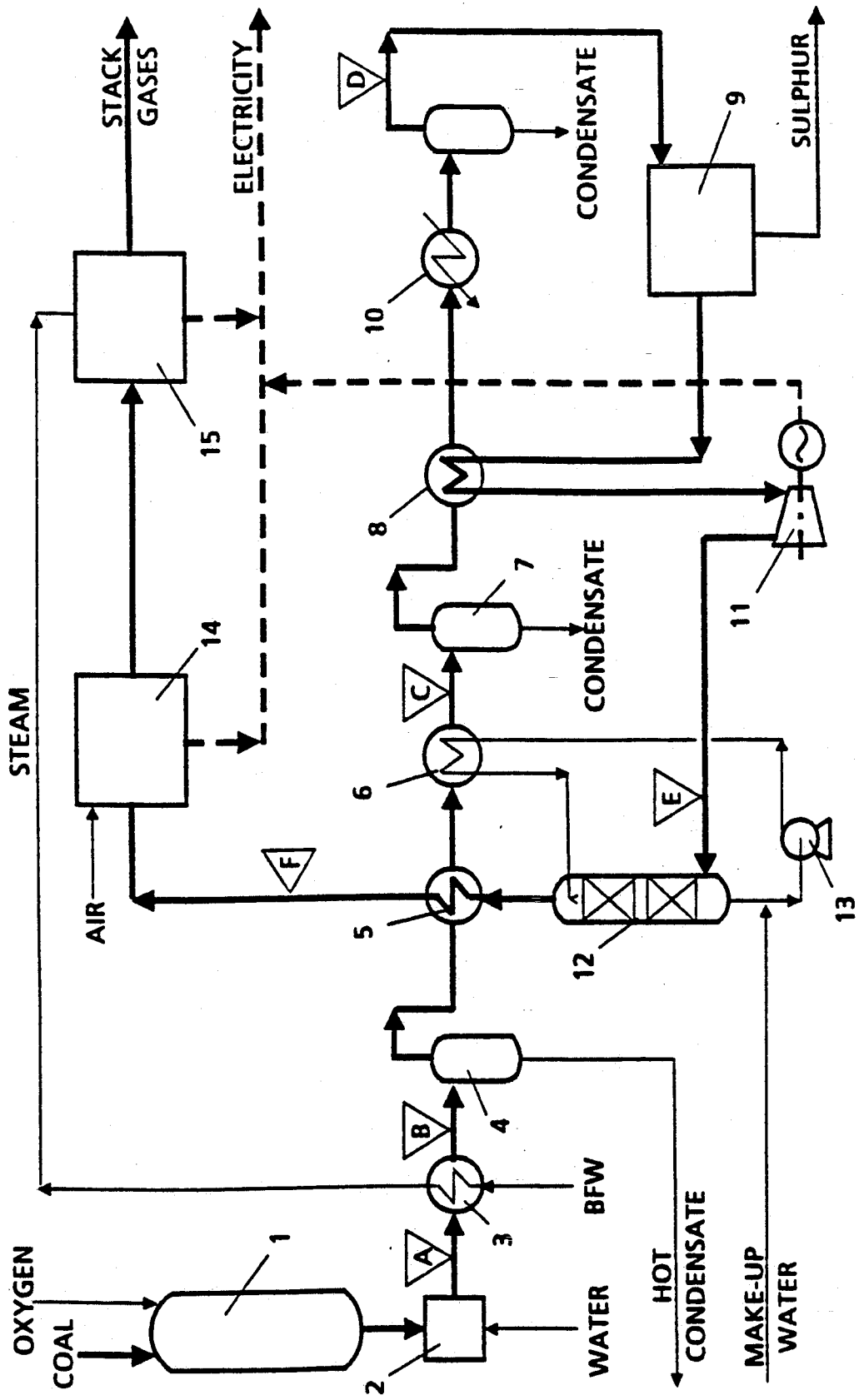
*FIG. 1, is a simplified flowscheme of a process as described in the specific embodiment of the invention. As part of the process the flowscheme shows an acid gas removal unit, removing sulphur from the quenched gas, in a location upstream of the pressure reduction described in claim 1. Carbon dioxide is not removed in this embodiment.*
Figure 2:
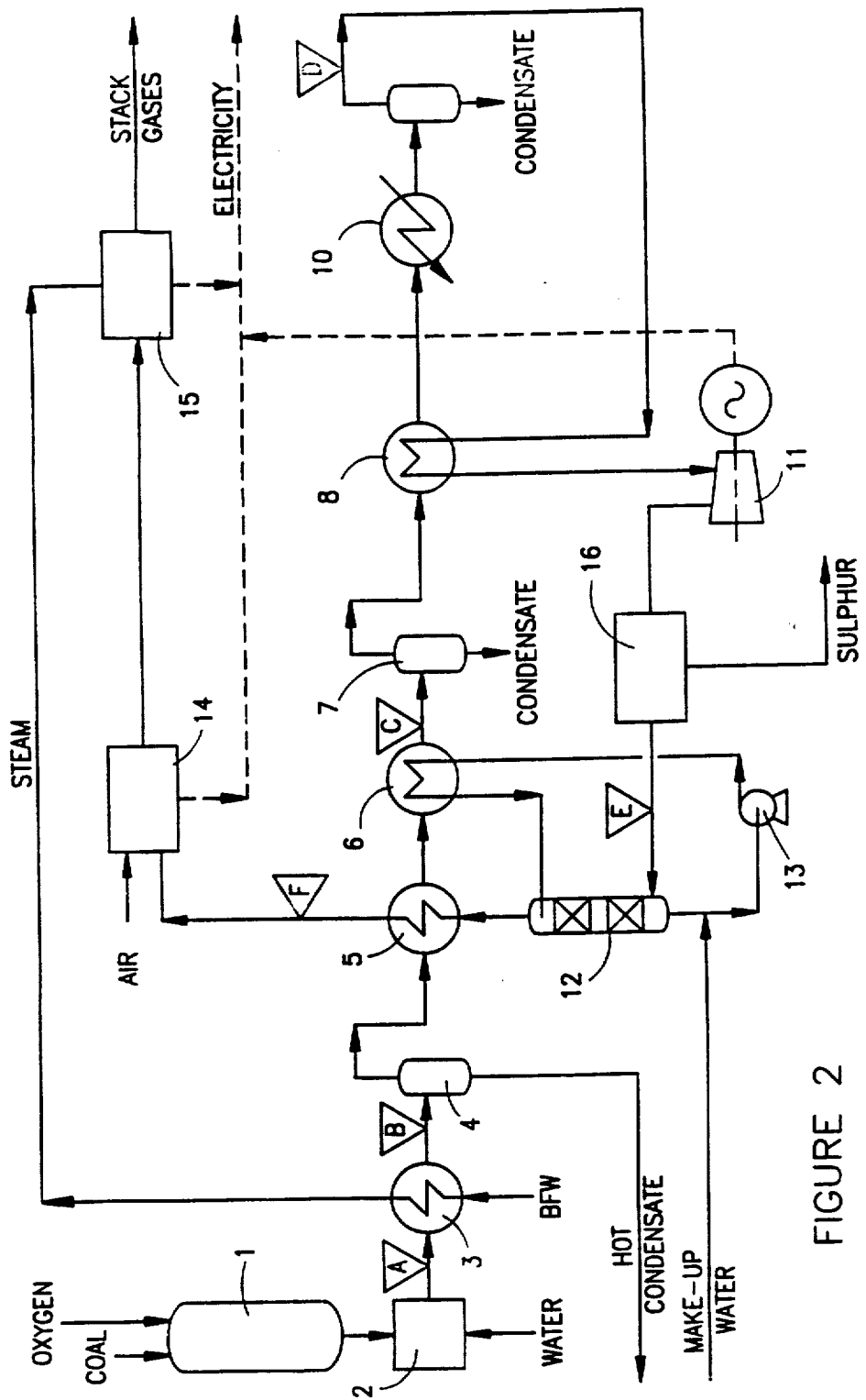
*FIG. 2, is a simplified flowscheme of a process as described in the specific embodiment of the invention. As part of the process the flowscheme shows an acid gas removal unit, removing sulphur from the quenched gas, in a location downstream of the pressure reduction described in claim 1. Carbon dioxide is not removed in this embodiment.*
Figure 3:
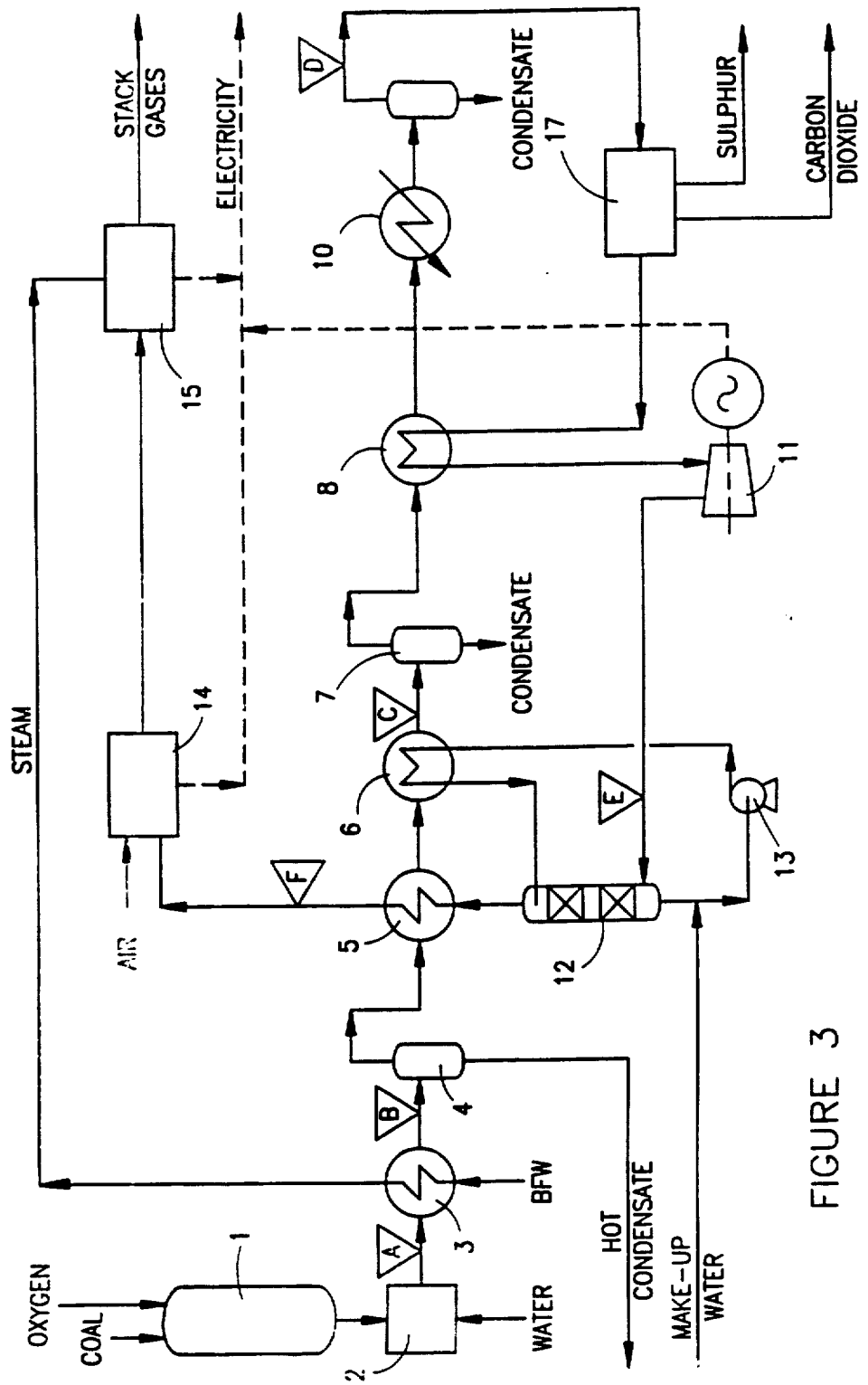
*FIG. 3, is simplified flowscheme of a process to illustrate the invention with carbon dioxide removal. As part of the process the flowscheme shows an acid gas removal unit, removing sulphur and carbon dioxide from the quenched gas, in a location upstream of the pressure reduction described in claim 1.*
Figure 4:
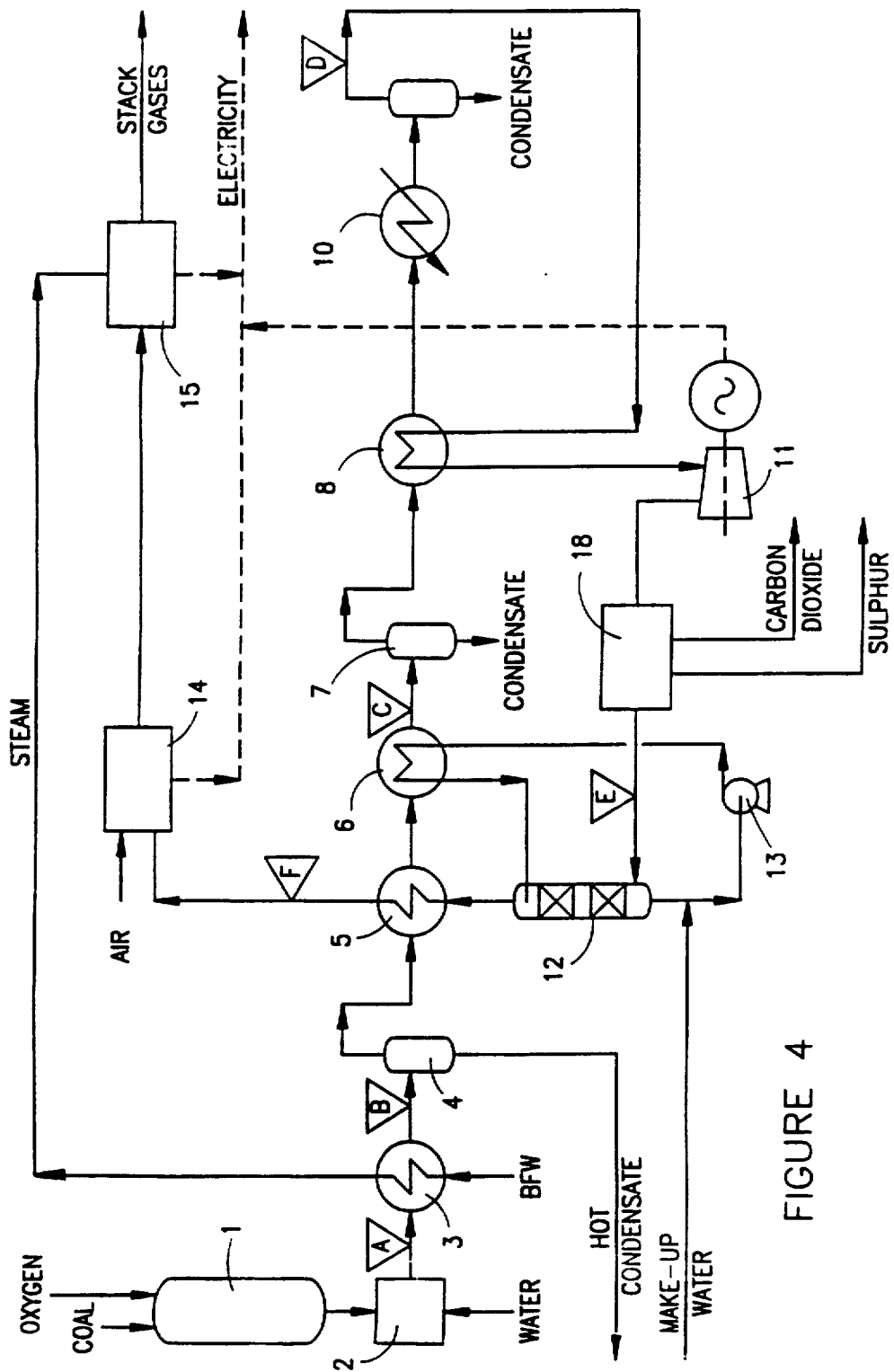
*FIG. 4, is a simplified flowscheme of a process to illustrate the invention with carbon dioxide removal. As part of the process the flowscheme shows an acid gas removal unit, removing sulphur and carbon dioxide from the quenched gas, in a location downstream of the pressure reduction described in claim 1.*

AS A RESULT OF REEXAMINATION, IT HAS BEEN DETERMINED THAT:

Claims 1 and 2 are determined to be patentable as amended.

Claims 3, 4, 5, 6 and 7, dependent on an amended claim, are determined to be patentable.

New claims 8 and 9 are added and determined to be patentable.

1. A process for the production of power from a carbonaceous fuel comprising the steps of partially oxidizing the fuel *at a pressure greater than 45 bara* with oxygen or an oxygen-containing gas to yield a partially oxidized gas stream containing combustible gas and [stream] *steam*; quenching the partially oxidized stream in a quenching unit with quench water to produce a quenched stream which is cooled and saturated; passing the quenched stream through a water-cooled heat exchanger in which the [steam] *stream* is further cooled by heat exchange with water circulating through said heat exchanger to produce a cooled gas stream and to heat said circulating water to produce a hot water stream; passing the cooled gas stream through a pressure reduction means to produce a low pressure stream; removing sulfur compounds from the cooled gas stream either before or after said pressure reduction; heating and [resaturing] *resaturating* the low pressure stream in a resaturator in which said hot water stream is used to provide the necessary humidity and heat *without the need to supply an additional source of heat for resaturating said low pressure stream* whereby a low pressure saturated gas stream is produced; and then burning the low pressure saturated gas stream in a gas turbine to produce power; said pressure reduction produced in said pressure reduction means being at least as much as ordinary line pressure drop which occurs between the quenching unit and the resaturator.

2. A process as described in claim 1 wherein the partial oxidization is carried out at a pressure greater than [30] *50* bara.

*8. The process of claim 1 wherein the cooled gas stream is passed through the pressure reduction means to reduce the pressure to about 21 bara.*

*9. The process of claim 2 wherein the cooled gas stream is passed through the pressure reduction means to reduce the pressure to about 21 bara.*

* * * * *